Dec. 5, 1950          L. W. BAKER          2,532,879
FISH LURE
Filed May 6, 1948
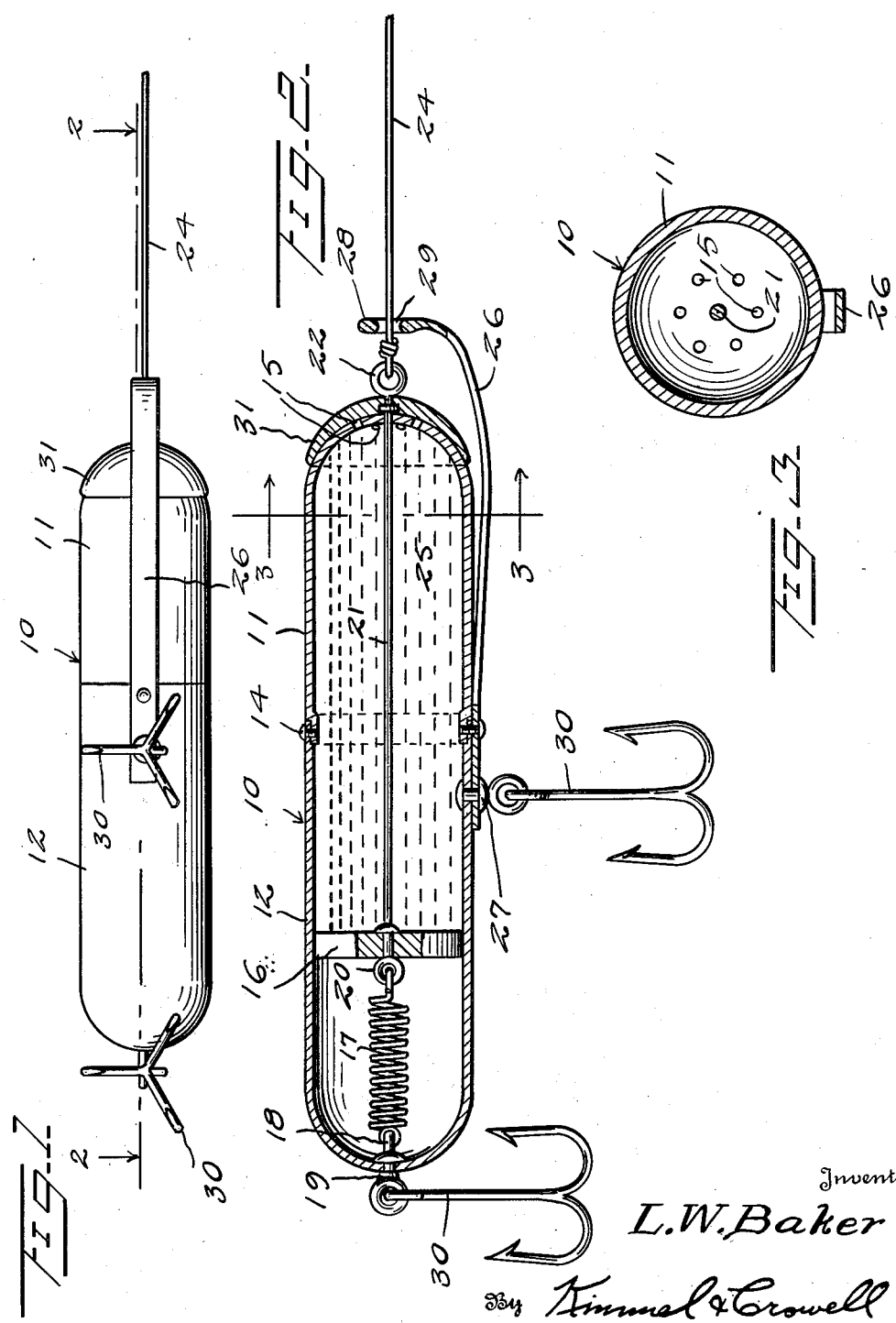
Inventor
L. W. Baker
By Kimmel & Crowell
Attorneys Patented Dec. 5, 1950

2,532,879

UNITED STATES PATENT OFFICE 2,532,879

FISH LURE

Lester W. Baker, Fort Worth, Tex.

Application May 6, 1948, Serial No. 25,430

3 Claims. (Cl. 43—42.06)

This invention relates to an improved fishing lure.

It is an object of this invention to provide an improved fishing lure of the kind to be more particularly described hereinafter for discharging a liquid or fluid lure into the water by a pumping means which is actuated by alternately tensioning and relaxing the fishing line.

Another object of this invention is to provide a fishing lure of this kind having a cap or valve for closing the opening through which the fluid emerges which is actuated in timed relation to the movement of the pumping piston whereby the discharge openings will be maintained closed in the normal relaxed condition of the lure so that no foreign material will enter and the lure fluid will not be unnecessarily diluted but will be opened to permit the free flow of fluid when the pump is actuated for discharging the fluid from the lure.

A further object of this invention is to provide a fish lure for pumping a fish lure liquid upon jerking of the fishing line which will actuate a pump so as to discharge the lure liquid into the water before the fish strikes. The lure also includes a stop or limit means which will limit the operation of the pump after the fish strikes.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawing:

Figure 1 is a top plan view of an improved fishing lure constructed according to an embodiment of my invention.

Figure 2 is a longitudinal section taken on the line 2—2 of Figure 1.

Figure 3 is a transverse section taken on the line 3—3 of Figure 2.

Referring to the drawing, the numeral 10 designates generally a hollow body which constitutes the cylinder of the fishing lure of this invention. The hollow body is formed of a front section 11 and a rear section 12 which are connected together intermediate the length of the body 10 by rivets 14 or other suitable fastening members. The hollow body 10 constitutes an elongated cylinder which is closed at the rear end and formed with a plurality of openings 15 at the front end thereof. A piston 16 is slidable within the body 10 and is normally disposed within the rear section 12. A spring 17 is connected between the piston 16 and the rear wall. An eye 18 having a shank 19 extends through the rear wall of the rear section 12 being fixed relative to the rear section 12 and the spring 17 is connected at one end to the eye 18 and at the other end to an eye 20 mounted on the rear side of the piston 16. The spring 17 then normally urges the piston 16 toward the rear end of the body 10. A rod 21 is fixed to the forward side of the piston 16 and extends forwardly slidably through the body 10 through the center of the front wall thereof. An eye 22 is provided on the forward end of the rod 21 to which may be attached the fishing line 24.

A suitable liquid 25 is disposed within the body 10 forwardly of the piston 16 to be forced through the apertures 15 when the piston is slid forwardly in the body. The body 10 may be filled by pulling rod 21 and piston 16 forwardly and then placing body 10 in the lure liquid. Upon release of rod 21 spring 17 will pull piston 16 inwardly so that a substantial quantity of liquid will be drawn into body 10 before valve 31 closes openings 15. Additional liquid may be put into body 10 by moving rod 21 and valve 31 outwardly a slight distance and then forcing the liquid through a small tube abutting one of the holes 15. The fluid 25 may be an oil or colored liquid or other suitable lure of this type. An elongated strap 26 is fixed at one end to the body 10 by a rivet or other suitable fastening member 27 and is provided with a loop 28 at its forward end disposed forwardly of the front end of the body 10. The opening 29 through the loop 28 is formed smaller than the eye 22 on the rod 21 so that the strap 26 limits the forward movement of the rod. Suitable hooks as 30 are fixed on the body 10 at the rear end and intermediate the length thereof as desired.

In the use and operation of this fishing lure the liquid lure is disposed within the body 10 forwardly of the piston 16. In use when the tension on the line 24 is intermittently increased the piston 16 will be caused to slide forwardly in the body 10 for forcing the liquid out of the apertures 15. A valve 31 which is formed of a concavo-convex plate is fixed to the forward end of the rod 21 for movement therewith and is adapted to engage over the forward end of the body 10 for closing the openings 15 in the rearward position of the piston 16. In this way the liquid 25 is held from seeping through the openings 15 until the line 24 is tensioned sufficiently to overcome the opposing tension of the spring 17 and to move the piston forwardly and at the same time move the valve 31 away from the forward end of the body.

I claim:

1. A fish lure of the kind described comprising a hollow cylindrical body for enclosing a fluid therein and formed with fluid discharge ports at one end thereof, a piston slidable in said body, a spring engaging said piston and constantly urging said piston towards the other end of said body, a rod fixedly connected to said piston and extending slidably through said one end of said body, a valve member fixed on said rod for closing said ports in the spring biased position of said piston, means limiting the sliding of said rod to a distance substantially less than the distance from said piston in spring biased position to said one end of said body, and means connecting said rod to a fishing line for reciprocating said piston against the spring tension thereby opening said ports and discharging the fluid therefrom.

2. A fishing lure comprising a hollow cylindrical body for containing a fluid therein and formed with fluid discharge ports at one end thereof, a piston slidable in said body for pumping the fluid through said ports, spring means connected to said piston and said body and adapted to urge said piston towards the other end of said body, a valve normally closing said ports, means operatively connecting said piston and valve to a fishing line for opening said valve and discharging fluid upon tensioning of said line against the spring tension in said piston, and means carried by said body and engageable with said last named means limiting the movement of said piston to a distance substantially less than the distance from said piston, in the spring-biased position thereof, to said one end of said body.

3. An improved fish lure comprising a hollow cylindrical body formed with outlet openings at one end thereof, a piston slidable in said body, spring means connected to said piston and said body and urging said piston towards the other end of the latter, a rod having one end connected to said piston and extending slidably through said one end of said body, an eye formed on the other end of said rod for attachment to a fishing line, an elongated member secured to the side of said body and extending beyond said one end of the latter, and an offset eye formed on said elongated member for receiving the fishing line and disposed in the path of movement of said rod to thereby limit the movement of said piston towards said one end of said body.

LESTER W. BAKER.

REFERENCES CITED

The following references are of record in the file of this patent:

UNITED STATES PATENTS

| Number | Name | Date |
|--------|------|------|
| 371,194 | Hayes | Oct. 11, 1887 |
| 2,465,127 | Stark | Mar. 22, 1949 |